(12) United States Patent
Inaba

(10) Patent No.: US 8,773,672 B2
(45) Date of Patent: Jul. 8, 2014

(54) MULTIFUNCTION PERIPHERAL AND METHOD FOR WARMING UP THE SAME

(75) Inventor: Michio Inaba, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1537 days.

(21) Appl. No.: 11/960,821

(22) Filed: Dec. 20, 2007

(65) Prior Publication Data

US 2008/0266588 A1    Oct. 30, 2008

(30) Foreign Application Priority Data

Dec. 25, 2006   (JP) ................................. 2006-347547

(51) Int. Cl.
    *G06F 3/12*    (2006.01)
(52) U.S. Cl.
    USPC .......... 358/1.13; 358/1.15; 358/1.1; 358/400; 358/406
(58) Field of Classification Search
    USPC ................ 358/1.13, 1.1, 1.15, 400, 406, 474; 710/14
    See application file for complete search history.

(56) References Cited

U.S. PATENT DOCUMENTS

| | | | | |
|---|---|---|---|---|
| 5,113,248 A | * | 5/1992 | Hibi et al. ....................... | 358/501 |
| 5,701,481 A | * | 12/1997 | Hosaka et al. ................. | 718/106 |
| 5,757,509 A | * | 5/1998 | Kubo ............................. | 358/296 |
| 7,209,265 B2 | * | 4/2007 | Kanno ........................... | 358/474 |
| 7,653,772 B2 | * | 1/2010 | Hayashi et al. ................ | 710/306 |
| 2001/0017700 A1 | * | 8/2001 | Homma .......................... | 358/1.1 |
| 2002/0136563 A1 | | 9/2002 | Maeda et al. | |
| 2003/0020760 A1 | | 1/2003 | Takatsu et al. | |
| 2003/0081261 A1 | | 5/2003 | Tanimoto | |
| 2005/0111866 A1 | * | 5/2005 | Sato ................................ | 399/79 |
| 2005/0219638 A1 | * | 10/2005 | Kasamatsu .................... | 358/400 |
| 2006/0045555 A1 | * | 3/2006 | Morimoto et al. .............. | 399/80 |
| 2006/0075150 A1 | * | 4/2006 | Hwang et al. ................... | 710/14 |
| 2006/0092453 A1 | * | 5/2006 | Okada et al. .................. | 358/1.14 |
| 2007/0098427 A1 | * | 5/2007 | Katsuhara ....................... | 399/75 |

FOREIGN PATENT DOCUMENTS

| | | |
|---|---|---|
| EP | 1005219 A2 | 5/2000 |
| JP | 2000-147966 A | 5/2000 |
| JP | 2002-108145 A | 4/2002 |
| JP | 2002-359703 | 12/2002 |

OTHER PUBLICATIONS

EP Search Report dtd Aug. 5, 2008, EP App 07254867.0.

* cited by examiner

*Primary Examiner* — Allen H Nguyen
(74) *Attorney, Agent, or Firm* — Banner & Witcoff, Ltd.

(57) ABSTRACT

There is provided a multifunction peripheral which comprises a first storage unit configured to store a relationship between a state change and at least one function expected to be used in relation to the state change, a detection unit configured to detect the state change, a function extraction unit configured to firstly extract at least one function which is expected to be used in relation to the state change detected by the detection unit in accordance with the relationship stored in the first storage unit and to secondly extract at least one function for which a predetermined condition concerning availability of each function is satisfied from among the firstly extracted at least one function, and a warm-up operation control unit configured to execute a warm-up operation of at least one device used to execute the at least one function secondly extracted by the function extraction unit.

14 Claims, 10 Drawing Sheets

221 STATE CHANGE MEMORY 

| STATE CHANGE(TRIGGER FOR OPERATION) | FUNCTION |
|---|---|
| "SETTING OF AN ORIGINAL TO THE ORIGINAL SETTING UNIT" | COPY<br>FAX TRANSMISSION<br>SCAN-TO-PC<br>SCAN-TO-USB |
| "INSERTION OF A USB MEMORY" | USB DIRECT PRINT<br>SCAN-TO-USB |
| "CLOSING OF ALL OF THE COVERS" | COPY<br>PRINTER |
| "ESTABLISHMENT OF CONNECTION TO PC" | PRINTER<br>SCAN-TO-PC |

FIG. 4

241 USER CONDITION MEMORY 

| USER | APPROVED FUNCTION |
|---|---|
| A | COPY<br>PRINTER<br>SCAN-TO-PC<br>SCAN-TO-USB<br>USB DIRECT PRINT |
| B | SCAN-TO-PC<br>SCAN-TO-USB |
| C | FAX TRANSMISSION<br>SCAN-TO-PC |

FIG. 5

222 EXECUTION CONDITION MEMORY 

| FUNCTION | EXECUTION CONDITION |
|---|---|
| COPY | ALL THE COVERS ARE CLOSED<br>AN ORIGINAL IS SET ON THE ORIGINAL BASE |
| PRINTER | ALL THE COVERS ARE CLOSED<br>RECEIVED DATA EXISTS |
| FAX TRANSMISSION | ALL THE COVERS ARE CLOSED |
| SCAN-TO-PC | CONNECTION TO PC IS ESTABLISHED<br>ALL THE COVERS ARE CLOSED |
| SCAN-TO-USB | ALL THE COVERS ARE CLOSED<br>USB MEMORY IS INSERTED |
| USB DIRECT PRINT | USB MEMORY IS INSERTED<br>USB MEMORY HAS PRINTABLE FILE<br>ALL THE COVERS ARE CLOSED |

FIG. 6

MULTIFUNCTION PERIPHERAL AND METHOD FOR WARMING UP THE SAME

CROSS-REFERENCE TO RELATED APPLICATION

This application claims priority under 35 U.S.C. §119 from Japanese Patent Application No. 2006-347547, filed on Dec. 25, 2006. The entire subject matter of the application is incorporated herein by reference.

BACKGROUND

1. Technical Field

Aspects of the present invention relate to a multifunction peripheral which is configured to have a plurality of types of function units capable of executing a plurality of types of functions by using one of the function units or some of the function units in combination.

2. Related Art

Multifunction peripherals having a plurality of functions, such as, a copying function, a facsimile function and a printing function, have been widely used. For example, a laser printer unit and a scanner unit are mounted on a multifunction peripheral. In general, such a multifunction peripheral is configured to move to a power save mode when a state where no access to the multifunction peripheral occurs continues for a predetermined time period so that power consumption is reduced. In the power save mode, power supply to a scanner or a laser printer in the multifunction peripheral is suspended.

One of such multifunction peripherals is configured to release the power save mode in response to a power save release signal generated by a sensor provided in one of the function units prior to a user's instruction. Japanese Patent Provisional Publication No. 2002-359703A (hereafter, referred to as JP2002-359703A) discloses such a multifunction peripheral. More specifically, the multifunction peripheral disclosed in JP2002-359703A is configured to exit from the power save mode and to supply power to a scanner unit again when an original is set on an original base. That is, the multifunction peripheral expects the scanner unit to be used when an original is set on the original base by a user.

However, there may be a case where a user uses the copying function of the multifunction peripheral after an original is set on the original base. Although the multifunction peripheral disclosed in JP2002-359703A starts to supply power again to the scanner unit after an original is set on the original base, the multifunction peripheral stays in a state of not supplying power to a printing unit (i.e., a laser printer unit in the multifunction peripheral) even when an original is set on the original base. In this case, when a user instructs the multifunction peripheral to execute the copying function, power is supplied to the printing unit after the instruction is accepted. Therefore, the user needs to wait for a certain time period until the copying function actually starts.

SUMMARY

Aspects of the present invention are advantageous in that at least a multifunction peripheral, a method and a computer readable medium, capable of quickly activating function units in response to user instructions by controlling a function unit having a relatively high possibility of being actually used by a user to execute a warm-up operation, is provided.

According to an aspect of the invention, there is provided a multifunction peripheral having a plurality of functions. The multifunction peripheral comprises a first storage unit configured to store a relationship between a state change caused on the multifunction peripheral and at least one function expected to be used in relation to the state change, a detection unit configured to detect the state change, a function extraction unit configured to firstly extract at least one function which is expected to be used in relation to the state change detected by the detection unit in accordance with the relationship stored in the first storage unit and to secondly extract at least one function for which a predetermined condition concerning availability of each function is satisfied from among the firstly extracted at least one function, and a warm-up operation control unit configured to execute a warm-up operation of at least one device used to execute the at least one function secondly extracted by the function extraction unit.

Such a configuration increases a possibility that a more appropriate function can be identified. Therefore, it is possible to identify a device having a high possibility of being used and to execute a warm-up operation for the identified device. As a result, it becomes possible to quickly operate the device in response to a user instruction and thereby to reduce power consumption.

In at least one aspect, the multifunction peripheral may comprise a second storage unit configured to store, for each of the plurality of functions, a relationship between a function and at least one execution condition to be satisfied to execute the function. In this case, the function extraction unit uses the relationship stored in the second storage unit as the predetermined condition so that the at least one function for which the at least one execution condition holds is extracted.

In the above mentioned configuration, the multifunction peripheral considers not only a state change detected by the detection unit but also whether the execution condition holds to identify the function expected to be used. Such a configuration increases a possibility that a more appropriate function can be identified. Therefore, it is possible to identify a device having a high possibility of being used and to execute a warm-up operation for the identified device. As a result, it becomes possible to quickly operate the device in response to a user instruction and thereby to reduce power consumption.

In at least one aspect, the multifunction peripheral may further comprise a second storage unit configured to store, for each of users, a relationship between a user and at least one function which the user is allowed to use, and a user authentication unit configured to execute user authentication. In this case, the function extraction unit uses the relationship stored in the second storage unit as the predetermined condition so that the at least one function which a current user is allowed to use is extracted.

In the above mentioned configuration, the multifunction peripheral considers not only a state change detected by the detection unit but also whether a current user is allowed to use a function. Such a configuration increases a possibility that a more appropriate function can be identified. Therefore, it is possible to identify a device having a high possibility of being used and to execute a warm-up operation for the identified device. As a result, it becomes possible to quickly operate the device in response to a user instruction and thereby to reduce power consumption.

According to another aspect of the invention, there is provided a method of warming up devices of a multifunction peripheral having a plurality of functions and a first storage unit configured to store a relationship between a state change caused on the multifunction peripheral and at least one function expected to be used in relation to the state change. The method comprises the steps of: detecting the state change; extracting firstly at least one function which is expected to be used in relation to the detected state change in accordance with the relationship stored in the first storage unit; extracting secondly at least one function for which a predetermined condition concerning availability of each function is satisfied from among the firstly extracted at least one function; and executing a warm-up operation of at least one device used to execute the extracted at least one function.

Such a configuration increases a possibility that a more appropriate function can be identified. Therefore, it is possible to identify a device having a high possibility of being used and to execute a warm-up operation for the identified device. As a result, it becomes possible to quickly operate the device in response to a user instruction and thereby to reduce power consumption.

In at least one aspect, the multifunction peripheral may further include a second storage unit configured to store, for each of the plurality of functions, a relationship between a function and at least one execution condition to be satisfied to execute the function. In this case, the step of secondly extracting comprises the step of using the relationship stored in the second storage unit as the predetermined condition so that the at least function for which the at least one execution condition holds is extracted.

In the above mentioned configuration, the multifunction peripheral considers not only a detected state change but also whether the execution condition holds to identify the function expected to be used. Such a configuration increases a possibility that a more appropriate function can be identified. Therefore, it is possible to identify a device having a high possibility of being used and to execute a warm-up operation for the identified device. As a result, it becomes possible to quickly operate the device in response to a user instruction and thereby to reduce power consumption.

In at least one aspect, the multifunction peripheral may further include a second storage unit configured to store, for each of users, a relationship between a user and at least one function which the user is allowed to use. In this case, the method further comprises: executing user authentication. Further, the step of secondly extracting comprises the step of: using the relationship stored in the second storage unit as the predetermined condition so that the at least function which a current user is allowed to use is extracted.

In the above mentioned configuration, the multifunction peripheral considers not only a detected state change but also whether a current user is allowed to use a function. Such a configuration increases a possibility that a more appropriate function can be identified. Therefore, it is possible to identify a device having a high possibility of being used and to execute a warm-up operation for the identified device. As a result, it becomes possible to quickly operate the device in response to a user instruction and thereby to reduce power consumption.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 4 illustrates a data structure of a state change condition memory.

FIG. 5 illustrates a data structure of a user condition memory.

FIG. 6 is a data structure of an execution condition memory.

DETAILED DESCRIPTION

Hereafter, an embodiment according to the invention will be described with reference to the accompanying drawings.

Figure 1:
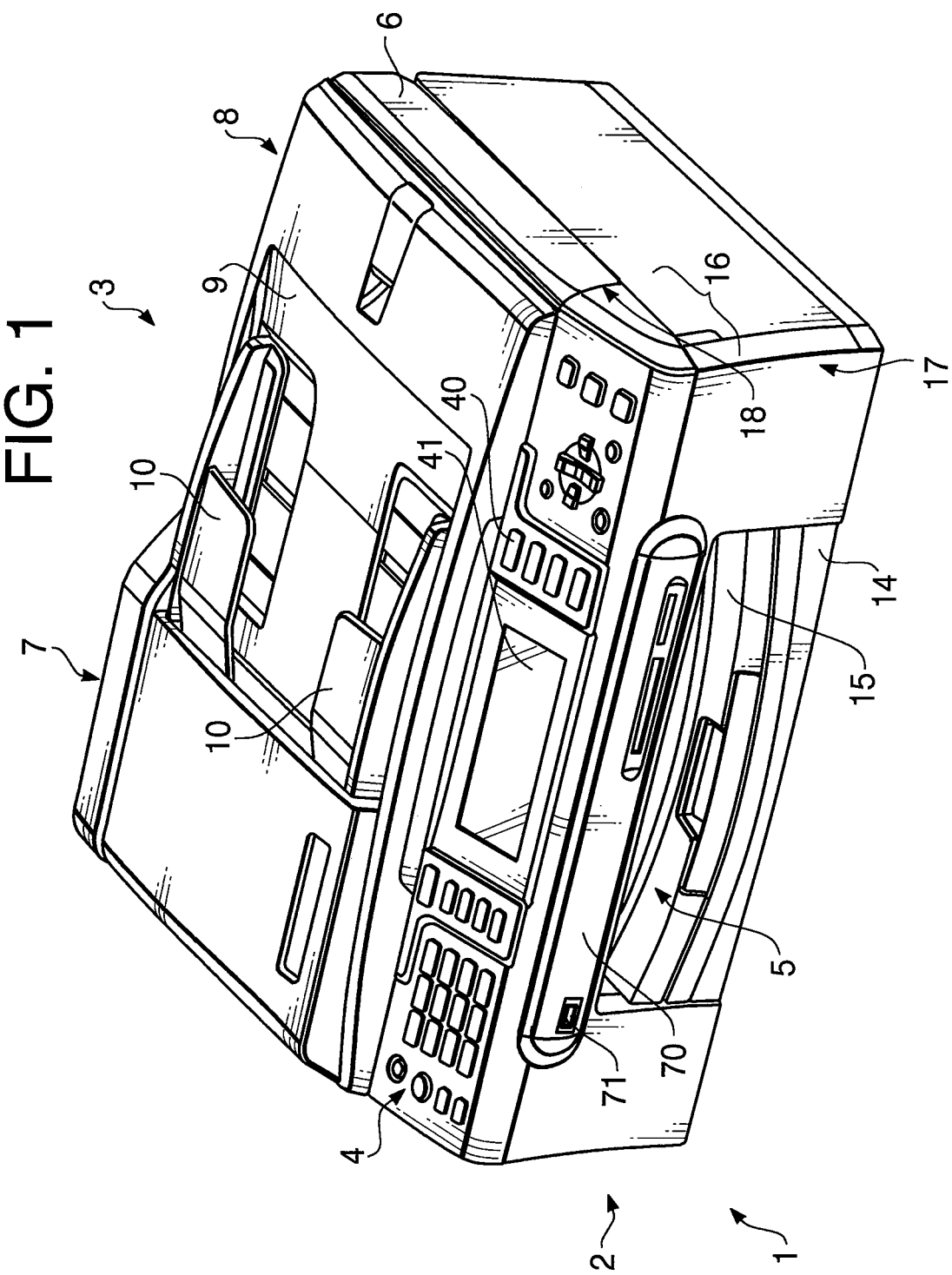
FIG. 1 is a perspective view illustrating an outer appearance of a multifunction peripheral device (MFP) according to an embodiment.
Figure 2:
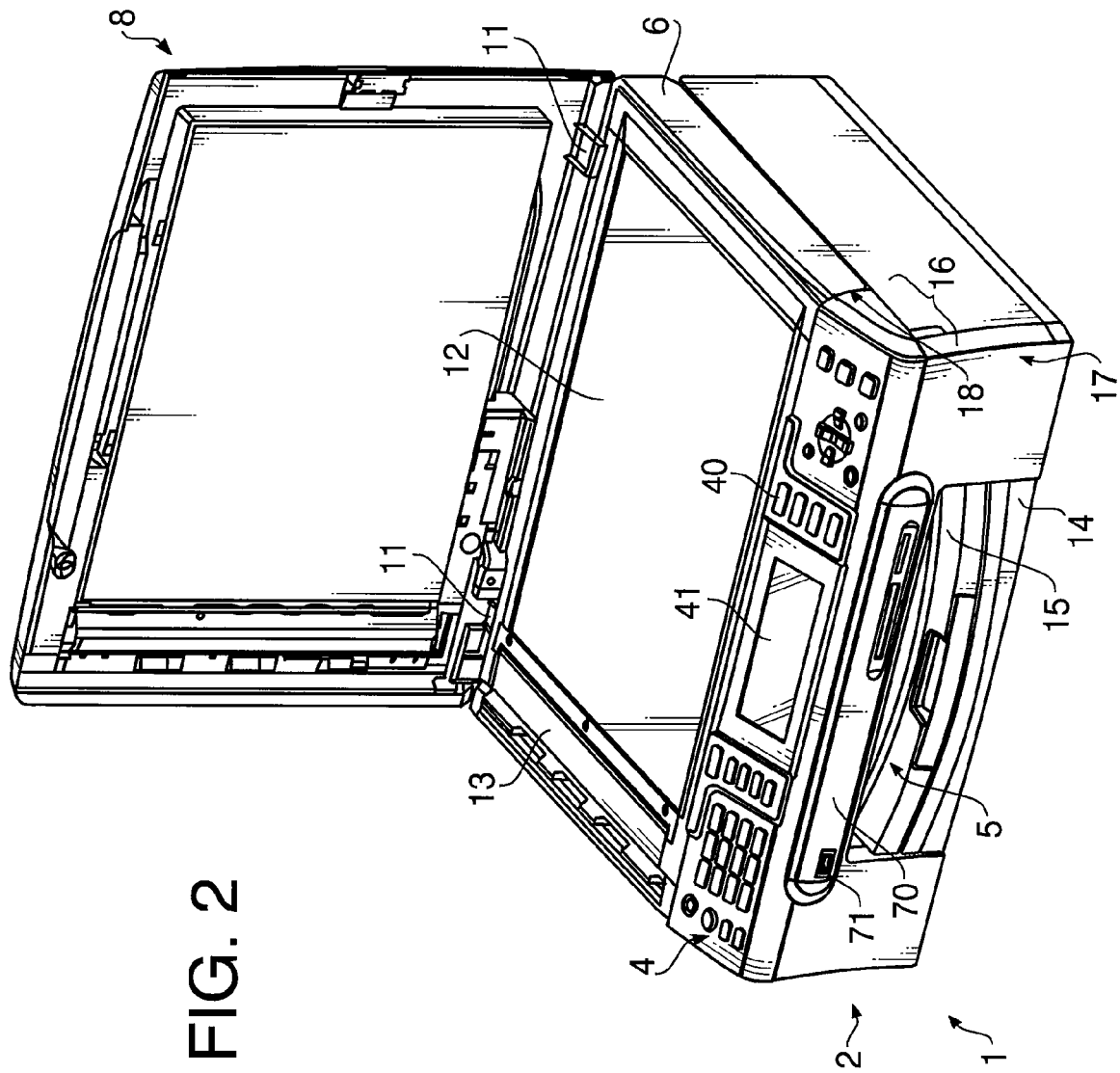
FIG. 2 is a perspective view of the MFP illustrating a state where a cover is opened.

FIG. 1 is a perspective view illustrating an outer appearance of a multifunction peripheral (MFP) 1 according to an embodiment. FIG. 2 is a perspective view of the MFP 1 illustrating a state where a cover 8 is opened.

As shown in FIGS. 1 and 2, the MFP 1 includes a printer 2 located on the lower part, a scanner 3 located on an upper part, and an operation panel 4 located on the front of the scanner 3. The printer 2, the scanner 3 and the operation panel 4 are integrally provided in the MFP 1. The MFP 1 has a copying function, a facsimile function, a printing function for recording data received from an external device (e.g., a PC (Personal Computer)) on a recording medium, a scan-to-PC function for transmitting data read by the scanner 3 to a PC, and a scan-to-USB function for storing data read by the scanner 3 in a USB memory.

The scanner 3 includes an original base 6 and the cover 8. The original base 6 serves to form a FBS (Flatbed Scanner). The cover 8 is configured to have an ADF (Auto Document Feeder). The cover 8 is attached to the original base 6 to be openable and closable, with respect to the original base 6, via hinges 11 (see FIG. 2) located at the rear of the original base 6. As shown in FIG. 2, a platen glass 12 is provided on the top of the original base 6. In the original base 6, an image reading unit (not shown) is provided.

The platen glass 12 is formed to be a rectangular shape having a longer side in a width direction of the MFP 1 when viewed as a plan view. The platen glass 12 is formed so that an original having a rectangular shape can be placed thereon in a lateral direction. In this case, the lateral direction means a direction which is parallel with the width direction of the MFP 1.

The top of the original base 6 is formed to have a large opening so that the platen glass 12 is fitted into the opening of the original base 6. In the original base 6, space for movement of the image reading unit and space for accommodating parts for supporting the image reading unit and a mechanism for driving the image reading unit are formed. Therefore, the top of the original base 6 is formed to be larger than the platen glass 12, and is formed to be geometrically similar to the platen glass 12 in a plan view. That is, similarly to the platen glass 12, the original base 6 has a rectangular shape elongated in the width direction and has a box shape having a certain height.

To use the scanner 3 as a FBS (Flatbed Scanner), a user places an original on the platen glass 12 in a state where the cover 8 is opened, and then closes the cover 8 so that the original is fixed. After an instruction for reading is inputted, the image reading unit moves along the bottom surface of the platen glass 12 to scan the original. Thus, the reading of the original is performed.

The image reading unit has a line image sensor elongated in a main scanning direction equal to a depth direction of the MFP 1. The line image sensor illuminates the original to receive light reflected from the original. The light reflected from the original is then received by an optoelectronic transducer and the optoelectronic transducer generates a signal corresponding to the intensity of received light so that the signal can be used to form an image of the original.

The ADF 7 serves to carry an original from an original tray 9 to an original ejection tray 10 through an original feed path. During a feeding process of an original by the ADF 7, the original passes a reading surface 13 on the original base 6 so that the original is read by the image reading unit located under the reading surface 13. Such a reading operation by the ADF 7 is performed in a state where the cover 8 is closed with respect to the original base 6. For the sake of simplicity, hereafter, the ADF 7, the original tray 9 and the platen glass 12 are called an original setting unit. The MFP 1 has a sensor (not shown) which detects whether an original is placed on the original setting unit.

The printer 2 is an image forming unit which records an image on a recording sheet based on image data read by the scanner 3 or image data inputted externally. As described above, the printer 2 is located under the scanner 3.

In this embodiment, the printer 2 is a laser beam printer. More specifically, in the printer 2, an electrostatically charged photosensitive drum is illuminated with a laser beam so that a voltage of the illuminated part is changed and a toner can be attracted by the illuminated part of the photosensitive drum. A latent image of the toner formed on the photosensitive drum is then transferred to a recording sheet by a transfer roll, and the toner image is fixed on the recording sheet by heat and pressure caused by a fixing unit. It is understood that the printer 2 may be another type of printer, such as an inkjet type printer or a thermal transfer printer.

On the front side of the MFP 1 (i.e., on the front side of the printer 2), an opening 5 is formed so that a sheet supply tray 14 and an ejection tray 15 can be accommodated in space defined by the opening 5. The sheet supply tray 14 and the ejection tray 15 are arranged such that the ejection tray 15 is stacked on the sheet supply tray 14.

In the printer 2, a sheet supply path is formed to extend upwardly from the rear of the sheet supply tray 14 and to bent toward the front side in a form of a letter U so that the sheet supply path is connected to the ejection tray 15. Each of sheets placed in the sheet supply tray 14 is carried to the sheet supply path in a state where a shorter edge of the sheet is first fed into the sheet supply path, and is turned along the U-shaped sheet supply path to be carried to an image forming position. At the image forming position, an image is formed on the sheet by a printing unit (e.g., a laser beam printing unit or an inkjet printing unit). After an image is formed on the sheet, the sheet is ejected to the ejection tray 15.

The printer 2 has openable and closable covers. When a paper jam occurs, the user is able to pull out the paper by opening the covers of the printer 2. By opening one of the covers, the user is also able to change toner. The printer 2 includes sensors, each of which detects an opened or closed state of each cover.

On the front side of the MFP 1, the operation panel 4 is provided. The operation panel 4 has a rectangular shape elongated in the lateral direction, and is provided with various operation keys 40 and a LCD (Liquid Crystal Display) 41. The operation panel 4 is used to control the printer 2 and the scanner 3. The user is allowed to input various instructions through the operation panel 4. When an instruction is inputted to the MFP 1, a control unit 20 (see FIG. 3) operates to execute a function of the MFP 1 based on the inputted instruction.

The MFP 1 is configured to operate based on instructions inputted through the operation panel 4 or instructions externally inputted to the MFP 1 from an external device (e.g., a printer driver or a scanner driver of a PC).

Figure 3:
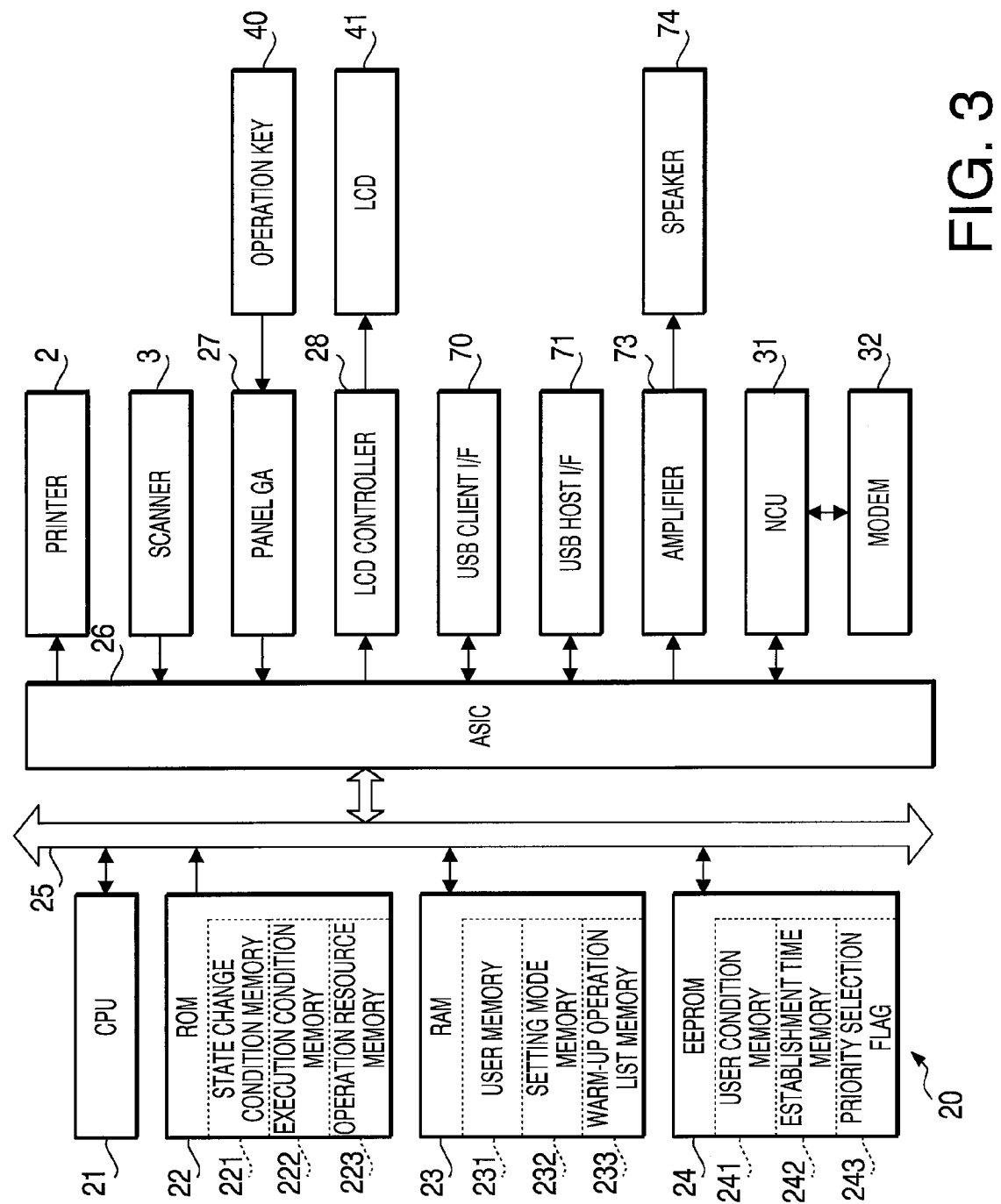
FIG. 3 is a block diagram illustrating a control system of the MFP.

FIG. 3 is a block diagram illustrating a control system of the MFP 1. The control unit 20 operates to control various operations of the MFP 1 including the printer 2 the scanner 3 and the operation panel 4. As shown in FIG. 3, the control unit 20 includes a CPU 21, a ROM 22, a RAM 23, and an EEPROM (Electrically Erasable and Programmable ROM) 24. The control unit 20 is, for example, a microcomputer chip having the above mentioned components. The control unit 20 is connected to an ASIC 26 via a bus 25.

The CPU 21 controls the functions of the MFP 1, and executes various programs shown in FIGS. 9 to 12. In the ROM 22, various programs are stored. The ROM 22 includes a state change condition memory 221, an execution condition memory 222, and an operation resource memory 223 which are explained later with reference to FIGS. 4, 6 and 8. The RAM 23 is used as a work memory of the CPU 21 to temporarily store data to be processed. The RAM 23 includes a user memory 231, a setting mode memory 232, and a warm-up operation list memory 233.

In the user memory 231, an ID (identification) of a current user of the MFP 1 is stored. To log in the MFP 1, the user operates the operation panel 4 or a PC connected to the MFP 1 via a network to input the user's own ID to the MFP 1. The ID inputted by the user is then stored in the user memory 231. The MFP 1 executes user authentication through the inputted ID. After the user authentication is finished, the MFP 1 moves to a state where the MFP 1 accepts instructions from the user.

The setting mode memory 232 stores functions (hereafter, frequently referred to as modes) which the user is allowed to used. When an instruction is inputted, the MFP 1 executes a process corresponding to the mode set in the setting mode memory 232. On the LCD 41, a menu screen corresponding to the mode set in the setting mode memory 232 is displayed.

When a copy mode is set in the setting mode memory 232, the MFP 1 executes the copying function of reading an original and printing out an image corresponding to the read data in response to a user instruction. When a facsimile transmission mode is set in the setting mode memory 232, the MFP 1 executes the facsimile function of reading an original and transmitting the image of the original as facsimile data in response to a user instruction. When a scan-to-PC mode is set in the setting mode memory 232, the MFP 1 executes the function of reading an original and transmitting the read data to a PC in response to a user instruction. When a scan-to-USB mode is set in the setting mode memory 232, the MFP 1 executes the function of reading an original and storing the read data in a USB memory attached to a USB host interface 71.

The use is allowed to manually change the mode set in the setting mode memory 232 by inputting a predetermined instruction in the MFP 1 through the operation panel 4. The mode set in the setting mode memory 232 is changed automatically in a warm-up operation judgment process (see FIG. 10) which is explained later.

The warm-up operation list memory 233 stores a warm-up operation list describing resources to be warmed up. The resources mean internal devices of the MFP 1 and are capable of operating independently with respect to each other. As basic resources, FIG. 3 illustrates the printer 2, the scanner 3, a USB client interface 70, the USB host interface 71, a NCU 31, and a modem 32. The MFP 1 suspends power supply to the printer 2 and the scanner 3 in response to the fact that a state where no access to the MFP 1 occurs continues for a predetermined time period. As a result, power consumption during a standby state can be reduced.

Figure 10:
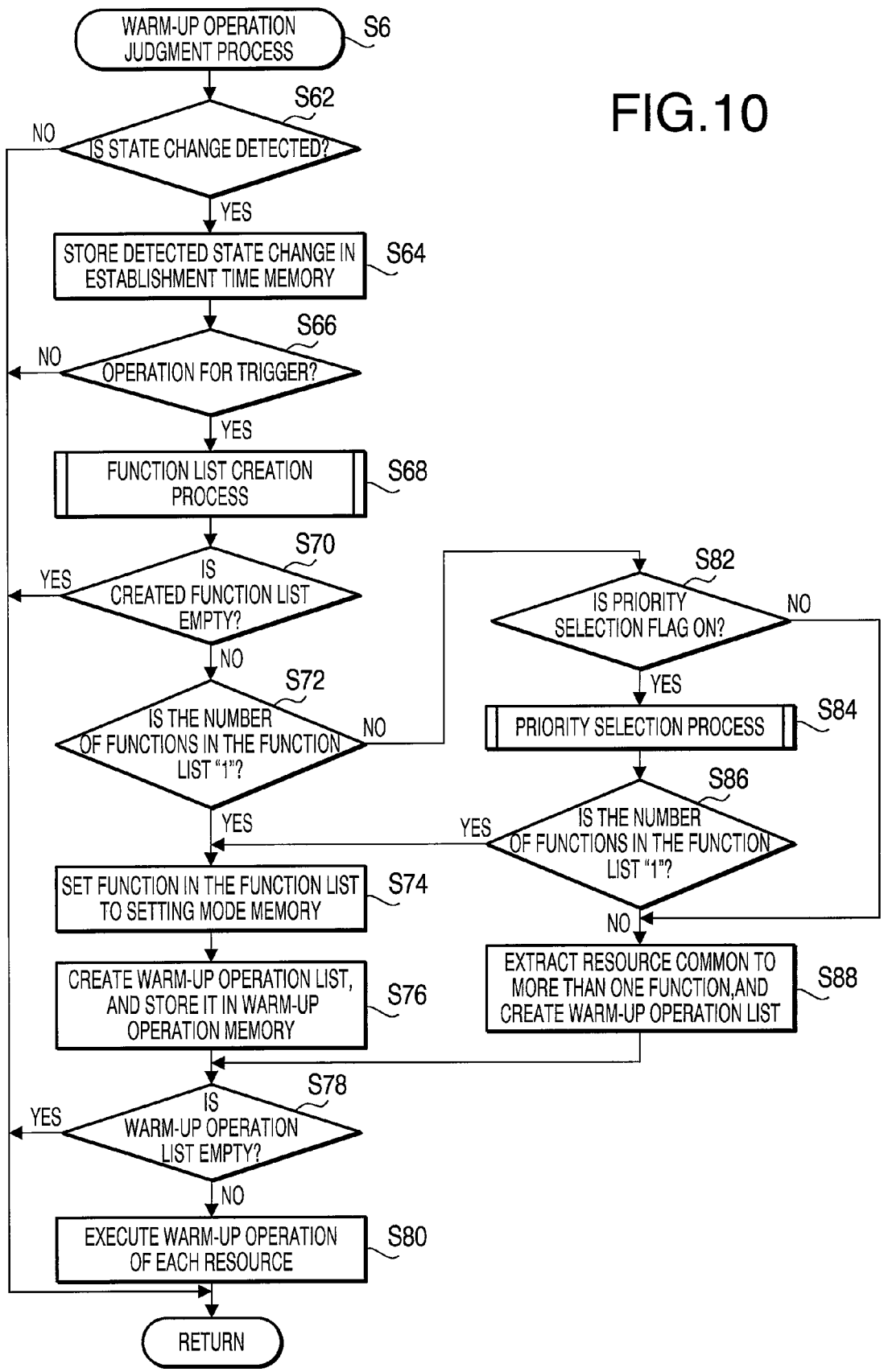
FIG. 10 is a flowchart illustrating a warm-up operation judgment process to be executed by the MFP.

If power supply to a resource is suspended, the resource takes a time to move to a ready state. For example, if power supply to the printer 2 is suspended, temperature of the fixing unit of the printer 2 decreases. Therefore, a certain time period is required to sufficiently increase the temperature of the fixing unit after the power supply to the printer 2 is restarted. If a light source of the scanner 3 is formed of a fluorescent tube, the fluorescent tube takes a time to move to a warmed up state. For this reason, the MFP 1 is configured to restart to supply power to resources prior to user instructions by the warm-up operation judgment process (FIG. 10). Therefore, the MFP 1 is able to quickly operate the resources in response to the user instructions. Timing and conditions for warming up (i.e., setting up) the resources will be described in detail later with reference to FIG. 10.

As shown in FIG. 3, the EEPROM 24 includes a user condition memory 241, an establishment time memory 242 and a priority selection flag 243. The user condition memory 241 stores a relationship between a user and functions which the user is allowed to use. The user condition memory 241 is described in detail later with reference to FIG. 5. The establishment time memory 242 stores, for each of execution conditions stored in the execution condition memory 222, a time (hereafter, frequently referred to as an establishment time) at which an execution condition is satisfied. The establishment time memory 242 is described in detail later with reference to FIG. 7.

The priority selection flag 243 is a flag used to indicate whether a priority selection switch provided on the operation panel 4 is ON. If the priority flag 243 is ON, the MFP 1 selects a function having a high priority from among functions which the MFP 1 is able to execute, and only the selected function is warmed up.

The ASIC 26 is connected to a panel gate array 27 which controls the operation keys 40 to be used by the user to input instructions to the MFP 1. The panel gate array 27 detects pressing of the operation keys 40 and outputs a code signal. Different key codes are assigned to the operation keys 40, respectively, so that each key can be identified by the key code. When the CPU 21 receives a certain key code from the panel gate array 27, the CPU 21 executes control processes according to a key process table.

The ASIC 26 is connected to a LCD controller 28 which controls the LCD 41. The LCD controller 28 controls the LCD 41 to display information concerning the printer 2 or the scanner 3. To the ASIC 26, an amplifier 73 is connected. The amplifier 73 outputs various sounds (e.g., a ringing sound or a beeping sound) through a speaker 74. To the ASIC 26, the USB client interface 70 and the USB host interface 71 operating to communicate with external devices are connected. A memory device can be connected to the USB host interface 71. The NCU 31 and the modem 32 are also connected to the ASIC 26.

Hereafter, the state change condition memory 222 is described with reference to FIG. 4. FIG. 4 illustrates a data structure of the state change condition memory 222. As shown in FIG. 4, the state change condition memory 222 stores a relationship between a state change and functions which are expected to be executed due to the state change. The state changes include "setting of an original to the original setting unit", "insertion of a USB memory", "closing of all of the covers" and "establishment of connection to PC". If one of such state changes is detected, there is a high possibility that a certain instruction is inputted by the user. For example, if the state "setting of an original to the original setting unit" is detected, it is expected that one of the copying function, the facsimile function, the scan-to-PC function and the scan-to-USB function is used.

As described below with reference to FIG. 10, when a state change is detected, one or more functions having a possibility of being used subsequently are extracted in accordance with the relationship stored in the state change condition memory 222. For example, when a state change where a USB memory is inserted into the USB host interface 71 is detected, the MFP 1 expects that a process concerning the USB memory (i.e., a USB direct printing function or a scan-to-USB function) is executed. Therefore, in this case, the USB direct printing function and the scan-to-USB function are extracted by the MFP 1 as functions expected to be used.

FIG. 5 illustrates a data structure of the user condition memory 241. The user condition means a relationship between a user identified by an ID and functions which the user is allowed to use. The user condition memory 241 stores such a relationship for each of users. For example, as shown in FIG. 5, the user A is allowed to use the copying function, the printing function, the scan-to-PC function, the scan-to-USB function and the USB direct print function. Therefore, when the user A instructs the MFP 1 to execute the FAX function, the MFP 1 does not execute the FAX function. It should be noted that the user condition stored in the user condition memory 241 can be modified through the operation keys 40.

FIG. 6 is a data structure of the execution condition memory 222. As shown in FIG. 6, in the execution condition memory 222, a function which the MFP 1 is able to execute is associated with one or more execution conditions to be satisfied to execute the function. Such a relationship is stored in the execution condition memory 222 for each of the functions of the MFP 1. For example, to execute the copying function, two execution conditions "all the covers are closed" and "an original is set on the original base" need to be satisfied. Therefore, if a user instructs the MFP 1 to execute a certain function for which all of the execution conditions are not satisfied, the MFP 1 does not execute the certain function. In this case, the MFP 1 may output an error message.

Figure 7:
FIG. 7 illustrates a data structure of an establishment time memory.

FIG. 7 illustrates a data structure of the establishment time memory 242. The establishment time memory 242 stores an execution condition and a time when the execution condition holds. The establishment time memory 242 stores such a relationship for each of the execution conditions. When the MFP 1 detects a condition "an original is set on the original base", the time at which the condition "an original is set on the original base" holds is written in the establishment time memory 242. On the other hand, when the original is removed from the original base and the MFP 1 detects that the execution condition is not satisfied, the MFP 1 writes "not-satisfied" in the establishment time memory 242.

Figure 8:
FIG. 8 illustrates a data structure of an operation resource memory.

FIG. 8 illustrates a data structure of the operation resource memory 223. As shown in FIG. 8, the operation resource memory 223 stores a relationship between a function and resources to be used for execution of the function. The operation resource memory 223 stores such a relationship for each of the functions of the MFP 1. As described in detail below with reference to FIG. 10, when a state change shown in FIG. 4 is detected by the MFP 1, the MFP 1 extracts a function having a high possibility of being used by the user based on the state change condition, the user condition and the execution condition. After the function having a high possibility of being used by the used is detected, resources for execution of the extracted function are extracted in accordance with the operation resource memory 223 shown in FIG. 8. Then, the MFP 1 selects resources requiring a warm-up operation from among the extracted resources, and warms up the selected resources. With this configuration, when a certain state change is detected, a function having a high possibility of being used can be extracted and thereby a warm-up operation can be started for resources used for the extracted function. Therefore, it is possible to move the resources to a sufficiently ready state until the use inputs an instruction to use the resources.

Hereafter, processes to be executed by the MFP 1 are described with reference to FIGS. 9 to 12.

Figure 9:
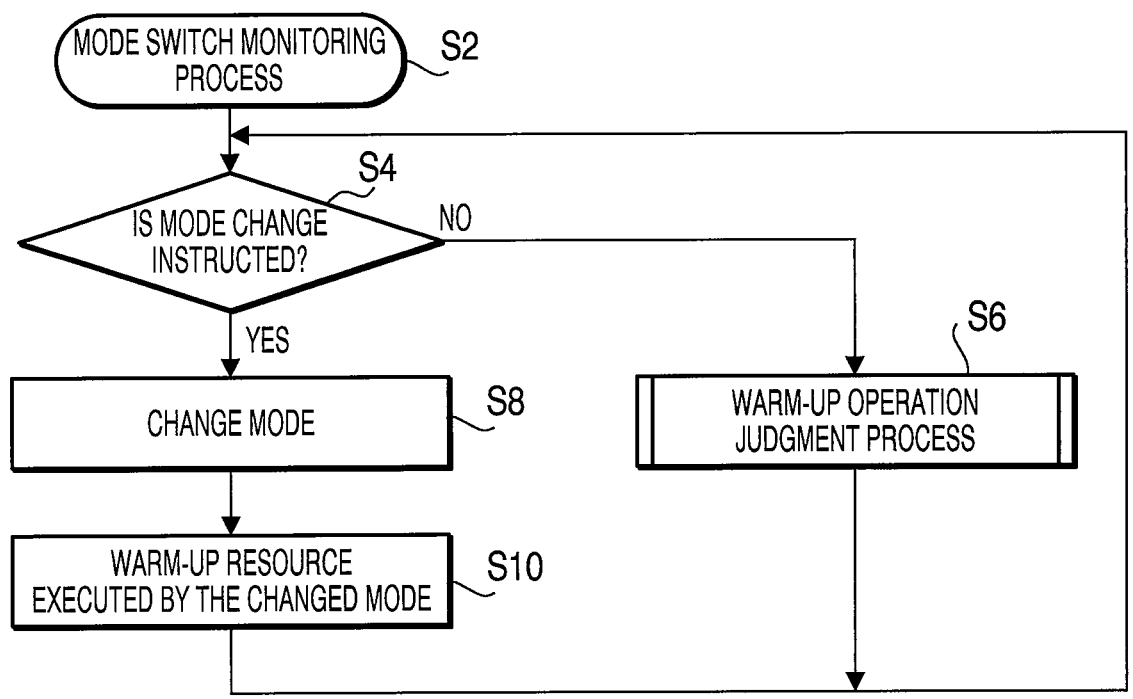
FIG. 9 is a flowchart illustrating a mode switch monitoring process to be executed by the MFP.

FIG. 9 is a flowchart illustrating a mode switch monitoring process to be executed under control of the CPU 21 of the MFP 1. The mode switch monitoring process is initiated when the MFP 1 is turned to on. First, the MFP 1 judges whether a mode change instruction for instructing the MFP 1 to change modes is inputted (step S4). If the mode change instruction is inputted (S4: YES), the MFP 1 stores the mode newly designated by the user in the setting mode memory 232 (step S8). Then, a menu screen corresponding to the newly designated mode is displayed on the LCD 41.

Next, the MFP 1 warms up a resource to be used for the newly designated mode (step S10). By thus starting the warm-up operation for the resources when an operation for changing modes is conducted, it is possible to quickly operate the resources when the user inputs an instruction for execution. If the mode change instruction is not inputted (S4: NO), the warm-up operation judgment process is executed (step S6).

FIG. 10 is a flowchart illustrating the warm-up operation judgment process to be executed under control of the CPU 21 of the MFP 1. First, the MFP 1 judges whether a state change is detected by checking the input from each sensor of the MFP 1 and a status of communication with external devices by the USB client interface 70 and the USB host interface 71 (step S62). If a status change is not detected (S62: NO), the warm-up operation judgment process terminates. If a status change is detected (S62: YES), the MFP 1 stores the detected status change in the establishment time memory 242 (step S64). For example, when a certain execution condition changes from a "not satisfied" state to a "satisfied" state, the time at which the certain execution condition changed is stored in the establishment time memory 242. On the other hand, when a certain execution condition changes from the "satisfied" sate to the "not satisfied" state, the MFP 1 writes "not satisfied" in the establishment time memory 242.

Next, the MFP 1 judges whether the detected state change is one stored in the state change condition memory 221 (step S66). If the detected state change is not stored in the sate change condition memory 221 (S66: NO), the warm-up operation judgment process terminates. If the detected state change is stored in the sate change condition memory 221 (S66: YES), the MFP 1 executes a function list creation process (step S68).

Figure 11:
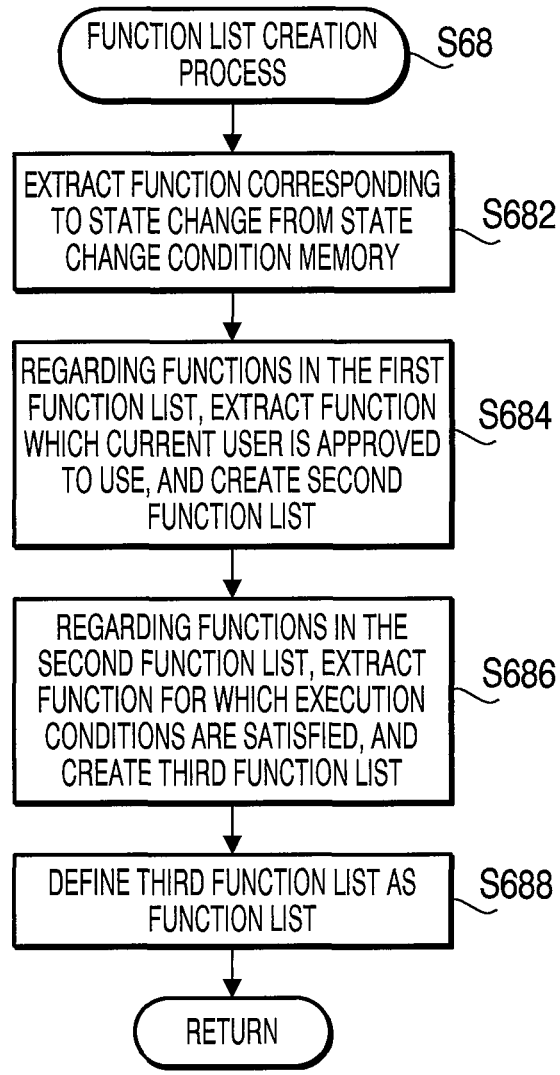
FIG. 11 is a flowchart illustrating a function list creation process to be executed by the MFP.

FIG. 11 is a flowchart illustrating the function list creation process to be executed under control of the CPU 21 of the MFP 1. By executing the function list creation process, functions having a high possibility of being used by the current user are extracted based on information stored in the state change condition memory 221, the user condition memory 241 and the execution condition memory 222, and the function list listing the extracted functions is created.

As shown in FIG. 11, when the function list creation process is initiated, the MFP 1 extracts functions having a possibility of being used by the user based on an immediately preceding status change, and creates a first function list listing the extracted functions (step S682). For example, if the immediately preceding status change is "setting of an original", the associated functions including the copying function, the FAX function, the scan-to-PC function and the scan-to-USB function are extracted (see FIG. 4).

Then, the MFP 1 narrows down the extracted functions based on the user condition. For example, if the ID of the current user is stored as "B" in the user memory 231, the functions "scan-to-PC" and "scan-to-USB" associated with the user B in the user condition memory 241 are extracted as functions for which the current user is allowed to use (see FIG. 5). Then, the MFP 1 selects the functions which the current user is allowed to used, from among the functions listed in the first function list, and creates a second function list listing the newly selected functions (step S684).

Next, the MFP 1 judges whether each function in the second function list satisfies the execution condition to extract only functions satisfying the execution condition from the second function list. Then, the MFP 1 creates a third function list listing the newly selected functions (i.e., functions satisfying the execution condition) (step S686). For example, if the second function list contains the copying function and the printing function, the MFP 1 checks whether the execution conditions "all the covers are closed" and "an original is set on the original base" corresponding to the copying function are satisfied, and further checks whether the execution conditions "all the covers are closed" and "there is received data" corresponding to the printing function are satisfied. The MFP 1 extracts the functions satisfying the above mentioned requirement from among the second function list and writes extracted functions in the third function list.

Then, the MFP 1 defines the third function list as a function list (step S688). Then, control returns to step S70 of FIG. 10. According to the function list creation process (S68), the function list listing functions having a high possibility of being used by the current user is thus created.

Referring back to FIG. 10, after the function list is created as above in step S68, the MFP 1 judges whether the function list is empty (step S70). If the function list is empty (S70: YES), the warm-up operation judgment process terminates. On the other hand, if the function list is not empty (i.e., if one or more functions are contained in the function list) (S70: NO), the MFP 1 judges whether the number of functions contained in the function list (i.e., the number of extracted functions) is "1" (step S72).

If the number of extracted functions is "1" (S72: YES), the MFP 1 assigns the extracted one function to the setting mode memory 232 (step S74). Then, a menu screen representing the assigned function is display on the LCD 41. As a result, one function having a highest possibility of being used by the user is automatically set. Therefore, the user does not need to conduct a manual operation for changing modes. A burden on the user can be reduced.

Next, the MFP 1 creates a warm-up operation list describing resources to be warmed up selected from among resources to be executed by the functions contained in the function list.

Then, the MFP 1 stores the warm-up operation list in the warm-up operation memory 233 (step S76).

Next, the MFP 1 judges whether the warm-up operation list is empty (step S78). If the warm-up operation list is empty (S78: YES), the warm-up operation judgment process terminates. If the warm-up operation list is not empty (S78: NO), warm-up operations of resources described in the warm-up operation list are executed (step S80). Therefore, if only one function is extracted in the function list created in the function list creation process (Step S68), the extracted function is automatically set as the function to be used by the user, and the warm-up operation for the resources for the execution of the function is started.

Next, the case where the number of extracted functions in the function list is equal to or larger than "2" is explained. If the number of extracted functions in the function list is equal to or larger than "2" (S72: NO), the MFP 1 judges whether the priority flag 243 is on (step S82). If the priority flag is on (S82: YES), a priority selection process (step S84) for narrowing down the functions in the function list to ones having high priority is executed. The priority selection process is described later with reference to FIG. 12.

After the priority selection process is finished, the MFP 1 judges whether the number of functions in the function list is "1" (step S86). If the number of functions in the function list is "1" (S86: YES), the MFP 1 executes the steps S74 to S86 as described above. That is, the mode is set, and the warm-up operation for resources to be executed for the extracted function is started.

If the number of functions in the function list is larger than or equal to "2" (S86: NO) or the priority selection flag is set to off (step S82: NO), the MFP 1 extracts resources common to the functions contained in the function list, and creates the warm-up operation list (step S88). Assuming that the function list contains the copying function and the printing function, as shown in the operation resource memory 223 of FIG. 8, the resources to be used by the copying function are the scanner 3 and the printer 2, and the resources to be used by the printing function are the printer 2 and the USB client interface 70. In this case, the resource common to the copying function and the printing function is the printer 2. Therefore, the MFP 1 writes the printer 2 in the warm-up operation list. Then, above mentioned process of step S78 and S80 are executed.

As described above, according to the warm-up operation judgment process (S6), when a state change is detected, functions satisfying the state change condition, the execution condition and the user condition (i.e., functions having a high possibility of being used) are extracted. Then, the warm-up operations for the resources to be used by the extracted function are started. Therefore, it is possible to quickly operate each internal device (resource) in response to a user instruction. Consequently, power consumption can be reduced.

Figure 12:
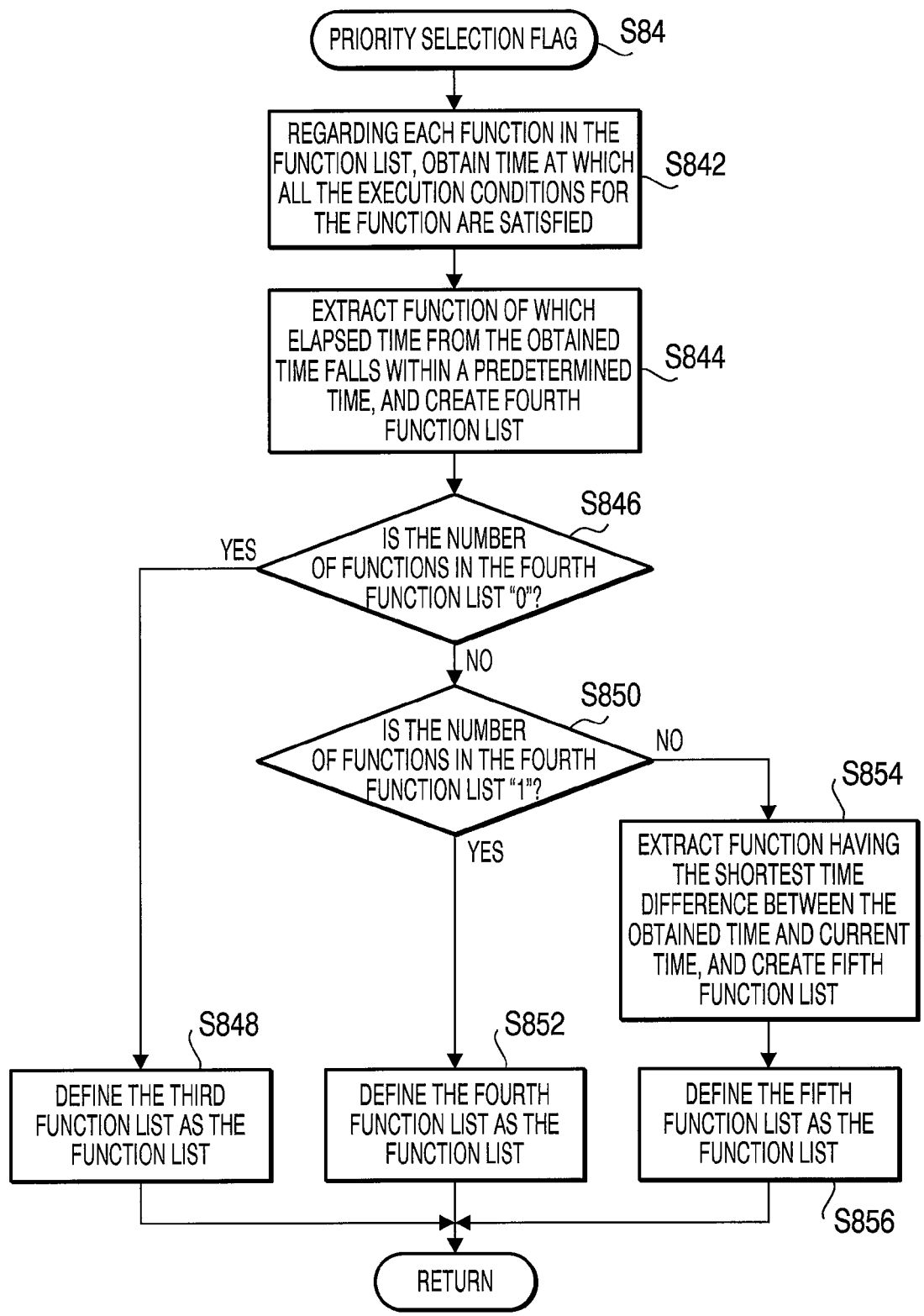
FIG. 12 is a flowchart illustrating a priority selection process to be executed by the MFP.

Next, the priority selection process (step S84) is explained with reference to FIG. 12. The priority selection process is executed when the function list contains more than one function and the priority selection flag 243 is ON. By executing the priority selection process, the MFP 1 narrows down functions in the function list to one having a high possibility of being used.

First, the MFP 1 obtains a time at which all the execution conditions of a function in the function list are satisfied. The MFP 1 obtains such time information for each of the functions in the function list. For example, regarding the execution condition "all the covers are closed" of the copying function, the establishment time memory 242 in FIG. 7 shows that this execution condition is satisfied at "12:00, Oct. 1, 2006". Further, the establishment time memory 242 shows that the execution condition "an original is set on the original base" is satisfied at "9:30 Oct. 1, 2006". Therefore, in this case, the MFP 1 judges that the time at which all the execution conditions are satisfied for the copying function is "12:00, Oct. 1, 2006". It is understood that the time at which all the execution conditions are satisfied can be obtained for each of the functions in the function list based on time information stored in the establishment time memory 242.

Next, the MFP 1 extracts functions of which elapsed-times from the time at which all the execution conditions are satisfied fall within a predetermined time period, from among the functions for which the time at which all the execution conditions are satisfied has been obtained. Then, the MFP 1 stores the extracted functions in a fourth function list (step S844). A function of which elapsed-time from the time at which all the execution conditions of the function are satisfied falls within the predetermined time period has a higher possibility of being used in comparison with a function of which elapsed-time from the time when all the execution conditions are satisfied is relatively long. Therefore, the functions having such a high possibility of being used are regarded as functions having high priority.

Next, the MFP 1 judges whether the number of functions in the fourth function list is "0" (step S846). If the number of functions in the fourth function list is "0" (i.e., if no function has an elapsed-time falling within the predetermined time period) (S846: YES), the third function list created in the function list creation process (S68) is defined as the function list (step S848). Then, the priority selection process terminates. Therefore, it is possible to execute the warm-up operation of resources for each of the functions extracted by the function list creation process.

If the number of functions in the fourth function list is not "0" (S846: NO), the MFP 1 judges whether the number of functions in the fourth function list is "1" (step S850). If the number of functions in the fourth function list is "1" (S850: YES), the MFP 1 defines the fourth function list as the function list (step S852). Then, the priority selection process terminates.

If the number of functions in the fourth function list is not "1" (S850: NO) (i.e., the number of functions in the fourth function list is larger than or equal to "2"), a function having the shortest elapsed-time (i.e., having the shortest time difference between the current time and the time at which all the execution conditions are satisfied for the function) is extracted. Then, the MFP 1 creates a fifth function list containing the extracted function (step S854). Then, the MFP 1 defines the fifth function list as the function list (step S856). Then, the priority selection process terminates.

According to the above mentioned priority selection process, more than one functions extracted in the function list creation process (S68) can be narrowed down to one function having the highest possibility of being used. Therefore, the warm-up operation can be started only for the resources to be used to execute the function having the highest possibility of being used. As a result, power consumption can be reduced.

According to the warm-up operation judgment process explained with reference to FIGS. 10 to 12, it is possible to start in advance the warm-up operation only for the necessary resources.

Hereafter, seven examples of operation of the MFP 1 are explained.

In a first example, it is assumed that the following conditions (1) to (5) hold.

(1) The priority selection flag 243 is set to off.

(2) The covers are closed.

(3) The MFP 1 is in a state of being able to communicate with a PC via the USB client interface 70.
(4) No device is connected to the USB host interface 71.
(5) A user of which user ID is B has logged in the MFP 1 and the user has set an original on the original base.

In this case, only the function "scan-to-PC" is extracted by the function list creation process (S68). Therefore, the setting mode is changed to the scan-to-PC and the warm-up operation for the scanner 3 to be used for the scan-to-PC is started. More specifically, the warm-up operation of the scanner 3 is started when the user sets the original on the original base. At the time when the user inputs an instruction for execution, the scanner 3 is already supplied with sufficient power and therefore the scanner 3 is able to quickly operate in response to the user instruction for execution. Consequently, the waiting time for waiting for execution of the internal device can be decreased.

When a USB memory is inserted into the USB host interface 71 during use of the scanner 3, the function "scan-to-USB" is extracted by the function list creation process (S68). In this case, the warm-up operation for the scanner 3 is continued.

In a second example, it is assumed that the following conditions (1) to (4) hold.
(1) The priority selection flag 243 is set to off.
(2) The covers are closed.
(3) No device is connected to the USB client interface 70 and the USB host interface 71.
(4) A user of which user ID is B has logged in the MFP 1 and the user has set an original on the original base.

The functions which the user B is allowed to use are the scan-to-PC and the scan-to-USB. However, execution conditions of each of the scan-to-PC and the scan-to-USB do not hold. Therefore, in this case, no function is extracted by the function list creation process (S68), and no resource is subjected to a warm-up operation. That is, no resource is warmed up for a function for which the user condition or the execution condition does not hold. Consequently, power consumption can be reduced.

When a USB memory is inserted into the USB host interface 71 afterwards, the scan-to-USB is extracted by the function list creation process. In this case, the setting mode changes to the scan-to-USB, and the warm-up operation of the scanner 3 is started for the scan-to-USB function.

In a third example, it is assumed that the following conditions (1) to (5) hold.
(1) The priority selection flag 243 is set to off.
(2) The covers are closed.
(3) The MFP 1 is in a state of being able to communicate with a PC via the USB client interface 70.
(4) No device is connected to the USB host interface 71.
(5) A user of which user ID is A has logged in the MFP 1 and the user has set an original on the original base.

Since in this case the copying function and the scan-to-PC function are extracted by the function list creation process, the warm-up operation of the scanner 3 common to these functions is started. Therefore, it is possible to start the warm-up operation of the scanner 3 when the user sets an original on the original base. When the user inputs an instruction for executing the function, the scanner 3 is already in a state of being supplied with sufficient power. Consequently, a waiting time for waiting for execution of the resource can be decreased.

In a fourth example, it is assumed that the following conditions (1) to (6) hold.
(1) The priority selection flag 243 is set to off.
(2) The covers are opened.
(3) The MFP 1 is in a state of being able to communicate with a PC via the USB client interface 70.
(4) No device is connected to the USB host interface 71.
(5) Print data has not been received.
(6) A user of which user ID is A has logged in the MFP 1 and the user has set an original on the original base.

Since in this case the function extracted by the function list creation process is the scan-to-PC, the warm-up operation of the scanner 3 is started for the scan-to-PC function. When a USB memory is inserted into the USB host interface 71, the scan-to-USB is extracted by the function list creation process. Then, the mode changes to the scan-to-USB, and the warm-up operation of the scanner 3 is continued.

When the covers are closed afterwards, the copying function is extracted by the function list creation process, and the mode changes to the copying mode. In this case, the warm-up operation for the printer 2 is started, while the warm-up operation of the scanner 3 is continued. Since in this case the warm-up operation of the printer 2 is started when the covers are closed and the copying function becomes available, the power consumption can be reduced.

In a fifth example, it is assumed that the following conditions (1) to (6) hold.
(1) The priority selection flag 243 is set to on.
(2) The covers are closed (The establishment time is "9:00, Oct. 1, 2006").
(3) The MFP 1 is in a state of being able to communicate with a PC via the USB client interface 70 (The establishment time is "12:40, Oct. 1, 2006").
(4) A USB memory is connected to the USB host interface 71 (The establishment time is "12:50, Oct. 1, 2006").
(5) A user of which user ID is B has logged in the MFP 1 and the user has set an original on the original base.
(6) The current time is "13:00, Oct. 1, 2006".

In this case, the scan-to-PC and the scan-to-USB are extracted by the function list creation process, and only the scan-to-USB is extracted by the priority selection process. That is because the elapsed time from the time when all the execution conditions are satisfied for the scan-to-USB is shorter than or equal to ten minutes and therefore the scan-to-USB is considered as having a high possibility of being used subsequently. Therefore, in this case the mode changes to the scan-to-USB and the warm-up operation for the scanner 3 is started.

In a sixth example, it is assumed that the following conditions (1) to (6) hold.
(1) The priority selection flag 243 is set to on.
(2) The covers are closed (The establishment time is "9:00, Oct. 1, 2006").
(3) The MFP 1 is in a state of being able to communicate with a PC via the USB client interface 70 (The establishment time is "12:50, Oct. 1, 2006").
(4) A USB memory is connected to the USB host interface 71 (The establishment time is "12:55, Oct. 1, 2006").
(5) A user of which user ID is B has logged in the MFP 1 and the user has set an original on the original base.
(6) The current time is "13:00, Oct. 1, 2006".

In this case, the scan-to-PC and the scan-to-USB are extracted by the function list creation process, and only the scan-to-USB is extracted by the priority selection process. That is because the elapsed time from the time when all the execution conditions are satisfied for the scan-to-USB is the shortest, and therefore the scan-to-USB is considered as having a higher possibility of being used subsequently. Therefore, in this case the mode changes to the scan-to-USB and the warm-up operation for the scanner 3 is started. Consequently, it is possible to execute the warm-up operation only for the function having a high possibility of being used and therefore the power consumption can be reduced.

In a seventh example, it is assumed that the following conditions (1) to (6) hold.
(1) The priority selection flag 243 is set to on.
(2) The covers are closed (The establishment time is "9:00, Oct. 1, 2006").
(3) The MFP 1 is in a state of being able to communicate with a PC via the USB client interface 70 (The establishment time is "12:30, Oct. 1, 2006").
(4) A USB memory is connected to the USB host interface 71 (The establishment time is "12:40, Oct. 1, 2006").
(5) A user of which user ID is B has logged in the MFP 1 and the user has set an original on the original base.
(6) The current time is "13:00, Oct. 1, 2006".

In this case, the scan-to-PC and the scan-to-USB are extracted by the function list creation process. Since in this case no function has the elapsed time (from the time when all the execution conditions are satisfied for the function) falling within ten minutes, both of the scan-to-PC and the scan-to-USB are extracted by the priority selection process. Then, the warm-up operation of the scanner 3 common to both of these functions is started.

Although the present invention has been described in considerable detail with reference to certain preferred embodiments thereof, other embodiments are possible.

In the above mentioned embodiment, the MFP 1 is configured to have the copying function, the facsimile function, the printing function, the scan-to-PC function, and the scan-to-USB function. However, the MFP 1 is not required to have all of these functions because a requirement for a multifunction peripheral device is to have two or more functions.

The MFP 1 may be further provided with different functions, such as a PC-facsimile transmission function of transmitting, through a facsimile unit, data received from a PC, a PC-facsimile receiving function of transferring data received through the facsimile unit to the PC, and a media function of printing out data stored in a memory card which is inserted into a slot provided in the USB client interface 70.

In the function list creation process (S68), functions satisfying all of the state change condition, the user condition and the execution condition are extracted. However, the function list creation process may be configured to extract functions satisfying only the state change condition and the user condition. Alternatively, the function list creation process may be configured to extract functions satisfying only the state change condition and the execution condition.

In the above mentioned embodiment, it is explained that the printer 2 and the scanner 3 are target devices to be warmed up. However, the MFP 1 may be configured to have only one of these internal devices.

The MFP 1 may be provided with different types of devices as target devices to be warmed up.

What is claimed is:

1. A multifunction peripheral having a plurality of functions, the multifunction peripheral comprising:
    a first storage unit configured to store a relationship between a state change caused on the multifunction peripheral and a plurality of functions expected to be executed in relation to the state change;
    a second storage unit configured to store, for each of the plurality of functions, a relationship between a function and at least one execution condition to be satisfied to execute the function;
    a third storage unit configured to store a time at which the at least one execution condition stored in the second storage unit holds;
    a detection unit configured to detect a state change and an execution condition;
    a processor; and
    memory storing computer-readable instructions that, when executed by the processor, cause the multifunction peripheral to:
        extract a plurality of functions expected to be executed in relation to the state change detected by the detection unit based on the relationship stored in the first storage unit;
        extract, as a function list, one or more of the plurality of expected functions that respectively satisfy the execution condition detected by the detection unit;
        execute a warm-up operation of at least one device used to execute at least one function in the function list;
        extract, as the function list, one or more of the plurality of expected functions that respectively satisfy the execution condition detected by the detection unit using the relationship stored in the second storage unit;
        extract at least one function from the function list that satisfies a time extraction condition that an elapsed time, from the time stored in the third storage unit, falls within a predetermined time period; and
        execute a warm-up operation of at least one device used to execute the at least one function extracted by the processor.

2. A multifunction peripheral having a plurality of functions, the multifunction peripheral comprising:
    a first storage unit configured to store a relationship between a state change caused on the multifunction peripheral and a plurality of functions expected to be executed in relation to the state change;
    a detection unit configured to detect a state change and an execution condition;
    a processor; and
    memory storing computer-readable instructions that, when executed by the processor, cause the multifunction peripheral to:
        extract a plurality of functions expected to be executed in relation to the state change detected by the detection unit based on the relationship stored in the first storage unit;
        extract, as a function list, one or more of the plurality of expected functions that respectively satisfy the execution condition detected by the detection unit; and
        execute a warm-up operation of at least one device used to execute at least one function in the function list.

3. The multifunction peripheral according to claim 2, further comprising:
    a second storage unit configured to store, for each of the plurality of functions, a relationship between a function and at least one execution condition to be satisfied to execute the function,
    wherein the memory further stores computer-readable instructions that, when executed, cause the multifunction peripheral to extract, as the function list, one or more of the plurality of expected functions that respectively satisfy the execution condition detected by the detection unit using the relationship stored in the second storage unit.

4. The multifunction peripheral according to claim 3, further comprising:
    a third storage unit configured to store, for each of a plurality of users, a relationship between a user and at least one function which the user is allowed to use, wherein the memory further stores computer-readable instructions that, when executed, cause the multifunction peripheral to:
execute user authentication; and
extract at least one function from the function list for which a current user is allowed to use based on the relationship stored in the third storage unit.

5. The multifunction peripheral according to claim 2, wherein the memory further stores computer-readable instructions that, when executed, cause the multifunction peripheral to set at least one function in the function list as a function to be used by a user in response to a condition that the function list comprises only one function.

6. The multifunction peripheral according to claim 2, wherein the memory further stores computer-readable instructions that, when executed, cause the multifunction peripheral to execute, if the function list comprises a plurality of functions, a warm-up operation for at least one device used in common by at least two of the plurality of functions in the function list.

7. The multifunction peripheral according to claim 2, further comprising:
a second storage unit configured to store, for each of a plurality of users, a relationship between a user and at least one function which the user is allowed to use,
wherein the memory further stores computer-readable instructions that, when executed, cause the multifunction peripheral to:
execute user authentication; and
use the relationship stored in the second storage unit as the execution condition so that the at least one function which a current user is allowed to use is extracted.

8. The multifunction peripheral according to claim 2, wherein:
the plurality of functions expected to be executed in relation to the detected state change includes at least two of a printing function, a scanner function and a copying function; and
the at least one device to be targeted for the warm-up operation includes at least one of a printer and a scanner.

9. The multifunction peripheral according to claim 2, wherein the memory stores further computer-readable instructions that, when executed by the processor, cause the multifunction peripheral to execute a warm-up operation of a device used to execute two or more functions in the function list.

10. At least one non-transitory computer-readable medium having computer-executable instructions stored thereon that, when executed, cause at least one computing device to:
detect a state change in a multi-function peripheral ("MFP") and an execution condition prior to receiving a user instruction to perform a function, wherein the state change and the execution condition are different;
determine, based on the detected state change, whether an available function of the MFP is likely to be used and satisfies the execution condition; and
in response to determining that an available function of the MFP is likely to be used and that the available function satisfies the execution condition, cause a warm-up operation of at least one device used to execute the available function.

11. The at least one non-transitory computer-readable medium of claim 10, wherein the available function is a copy function and the detected state change is an original document being set onto an original setting unit associated with the MFP.

12. The at least one non-transitory computer-readable medium of claim 10, wherein the available function is a direct print function and the detected state change is a USB memory being inserted into the MFP.

13. The at least one non-transitory computer-readable medium of claim 10, wherein the available function is a print function and the detected state change is a connection being established between the MFP and a personal computer.

14. The non-transitory computer-readable medium according to claim 10, wherein the instructions that, when executed, cause the at least one computing device to execute a warm-up operation of a device used to execute two or more available functions.

* * * * *

UNITED STATES PATENT AND TRADEMARK OFFICE
CERTIFICATE OF CORRECTION

| | | |
|---|---|---|
| PATENT NO. | : 8,773,672 B2 | Page 1 of 1 |
| APPLICATION NO. | : 11/960821 | |
| DATED | : July 8, 2014 | |
| INVENTOR(S) | : Inaba | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1736 days.

Signed and Sealed this
Twenty-ninth Day of December, 2015

Michelle K. Lee
*Director of the United States Patent and Trademark Office*